(12) United States Patent
Troy et al.

(10) Patent No.: US 9,892,558 B2
(45) Date of Patent: Feb. 13, 2018

(54) METHODS FOR LOCALIZATION USING GEOTAGGED PHOTOGRAPHS AND THREE-DIMENSIONAL VISUALIZATION

(71) Applicant: The Boeing Company, Chicago, IL (US)

(72) Inventors: James J. Troy, Issaquah, WA (US); Vladimir Karakusevic, Kirkland, WA (US); Christopher D. Esposito, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 15/047,655

(22) Filed: Feb. 19, 2016

(65) Prior Publication Data

US 2017/0243399 A1    Aug. 24, 2017

(51) Int. Cl.
| | | |
|---|---|---|
| *G06T 19/00* | (2011.01) | |
| *G06T 7/00* | (2017.01) | |
| *G06F 17/30* | (2006.01) | |
| *G01S 19/13* | (2010.01) | |
| *B64F 5/00* | (2017.01) | |

(52) U.S. Cl.
CPC .......... *G06T 19/003* (2013.01); *B64F 5/0081* (2013.01); *G01S 19/13* (2013.01); *G06F 17/30268* (2013.01); *G06T 7/004* (2013.01); *G06T 19/00* (2013.01); *G06T 2219/2004* (2013.01)

(58) Field of Classification Search
CPC .......... B64F 5/0081; B64F 5/60; G06T 19/00; G06T 19/003; G06T 7/004; G01S 19/13; G06F 17/30268
See application file for complete search history.

(56) References Cited

U.S. PATENT DOCUMENTS

| | | |
|---|---|---|
| 7,643,893 B2 | 1/2010 | Troy et al. |
| 7,813,830 B2 | 10/2010 | Summers et al. |
| 7,859,655 B2 | 12/2010 | Troy et al. |
| 8,044,991 B2 | 10/2011 | Lea et al. |
| 8,199,194 B2 | 6/2012 | Troy et al. |
| 8,447,805 B2 | 5/2013 | Troy et al. |
| 9,182,487 B2 | 11/2015 | Troy et al. |
| 2010/0102980 A1 | 4/2010 | Troy et al. |
| 2012/0327187 A1 | 12/2012 | Troy et al. |
| 2014/0376768 A1 | 12/2014 | Troy et al. |
| 2015/0116481 A1 | 4/2015 | Troy et al. |

*Primary Examiner* — Robert Craddock
(74) *Attorney, Agent, or Firm* — Ostrager Chong Flaherty & Broitman P.C.

(57) ABSTRACT

Methods for identifying parts of a target object (e.g., an airplane) using geotagged photographs captured on site by a hand-held imaging device. The geotagged photographs contain GPS location data and camera setting information. The embedded image metadata from two or more photographs is used to estimate the location (i.e., position and orientation) of the imaging device relative to the target object, which location is defined in the coordinate system of the target object. Once the coordinates of the area of interest on the target object are known, the part number and other information associated with the part can be determined when the imaging device viewpoint information is provided to a three-dimensional visualization environment that has access to three-dimensional models of the target object.

20 Claims, 6 Drawing Sheets

METHODS FOR LOCALIZATION USING GEOTAGGED PHOTOGRAPHS AND THREE-DIMENSIONAL VISUALIZATION

BACKGROUND

This disclosure generally relates to systems and methods for determining the location (i.e., position and orientation) of an item of interest relative to a coordinate system of a target object and then identifying that item of interest. The item of interest may be a part of the target object (hereinafter "part of interest"). The target object may be an airplane.

Situations where location and part identification data is desirable are common in applications involving inspection, maintenance, and repair of airplanes in environments such as flight line operations, airplane-on-ground events and customer walks (inspections). It is common in these situations for on-site non-expert personnel to communicate with an off-site expert analyst regarding a problem or concern. It is common practice for support personnel to take photographs of damaged locations. Based on these photographs, an on-site or off-site expert analyst may attempt to define where the damage is located by visually comparing the image of the damaged location with available technical data such as drawings, 3-D models, manual illustrations and similar documentation. This gives a subjective indication of the location reference of the damaged location relative to a target object. Based on this location, analysis is conducted with a high probability of location error.

The communication of information by an on-site technician may include the transmission of digital photographs of the area of interest to the off-site expert analyst using a smartphone, digital camera, tablet, laptop, notebook personal computer (PC), or other hand-held imaging device. Typically, the digital image files contains metadata such as date and time information and camera setting information (such as the camera model and make, and information that varies with each image such as orientation (rotation), aperture, shutter speed, and focal length). This metadata is typically stored in fields having a standard format, such as the EXIF format. "EXIF" is an acronym for "exchangeable image file", which is a standard that specifies the formats for images, sound and ancillary tags used by digital cameras (including smartphones), scanners and other systems handling image and sound files recorded by digital cameras.

It is often the case that a hand-held imaging device will have an integrated global positioning system (GPS) receiver, in addition to a camera and other sensors. These devices can add geographical location data into the digital image metadata fields, which procedure is commonly referred to as "geotagging". The integration of this type of data in digital image metadata storage fields can be very useful in locating where a photograph was taken. However, without additional context about the location (i.e., position and orientation) of the target object relative to the GPS frame of reference, this geotagging data is not sufficient to determine the location of the imaging device relative to the target object. Since a geotagged image does not contain enough data to fully describe the location of the imaging device relative to the target object, the process of identifying a part of interest in the image can be difficult.

It would be advantageous to provide a method capable of identifying parts of target objects based on geotagged photographs of areas of interest using relatively inexpensive hand-held imaging devices.

SUMMARY

The subject matter disclosed in detail below is directed to methods for identifying parts of a target object (e.g., an airplane) using geotagged photographs captured on site by a hand-held imaging device. The geotagged photographs contain GPS location data and camera setting information. The embedded image metadata from two or more photographs is used to estimate the location (i.e., position and orientation) of the imaging device relative to the target object, which location is defined in the coordinate system of the target object. Once the coordinates of the area of interest on the target object are known, the part number and other information associated with the part can be determined when the imaging device viewpoint information is provided to a three-dimensional (3-D) visualization environment that has access to 3-D models of the target object.

In accordance with some embodiments, embedded image metadata from multiple digital photographs is extracted and processed using Cartesian coordinate conversion and coordinate system transformations to provide an estimate of the location of the imaging device relative to the target object, which location is defined in the coordinate system of the target object. This location data is then used by a 3-D visualization application to set an initial virtual viewpoint defined in the coordinate system of the target object. The relative location may then be further refined using interactive or automatic alignment of the image and 3-D model to determine precise coordinates, and then the identities (part numbers, etc.) of parts of interest can be extracted from the 3-D model of the target object. This easy-to-use process can assist support and services personnel in determining the information needed to assess potential damage to the target object in the appropriate context.

One aspect of the subject matter disclosed in detail below is a method for identifying a part of a target object, comprising: (a) acquiring reference location image data, first geolocation data and first heading angle data using an imaging device directed toward the target object and located at a known reference location relative to a coordinate system of the target object; (b) acquiring feature location image data, second geolocation data and second heading angle data using an imaging device directed toward an area on the target object and located at an unknown feature location relative to the coordinate system of the target object; (c) computing a Cartesian coordinate offset between the feature location and the reference location, wherein the offset is a function of coordinates in the first and second geolocation data and heading angles in the first and second heading angle data; (d) retrieving three-dimensional model data of the target object from a three-dimensional model database; (e) displaying a three-dimensional model image of at least a portion of the target object with a viewpoint that is a function of the offset computed in step (c) and the field-of-view angle of the imaging device, the three-dimensional model image representing the three-dimensional model data retrieved from the three-dimensional model database; (f) displaying a feature location image of the same portion of the target object as an overlay or background to the three-dimensional model image, the feature location image representing at least portions of the feature location image data; (g) adjusting a position of the three-dimensional model image to align the three-dimensional model image with the feature location image on the display screen; (h) selecting a point in the displayed feature location image based on the damage shown in the feature location image; (i) retrieving additional three-dimensional model data from the three-dimensional model database in response to the selecting; and (j) displaying symbology (e.g., alphanumeric symbols) representing the retrieved additional three-dimensional model data. The additional three-dimensional model data may comprise part identification data that identifies a part of the target object associated with an area of the three-dimensional model image containing the selected point and/or coordinates of the selected point in the coordinate system of the target object. The displayed feature location image may comprise an outline extracted from the feature location image data using edge detection.

Another aspect of the subject matter disclosed in detail below is a method for identifying a part of a target object, comprising: (a) acquiring reference location image data, first geolocation data and first heading angle data using an imaging device directed toward the target object and located at a known reference location relative to a coordinate system of the target object; (b) constructing a reference location data file containing at least the reference location image data, the first geolocation data and the first heading angle data; (c) acquiring feature location image data, second geolocation data and second heading angle data using an imaging device directed toward an area on the target object and located at an unknown feature location relative to the coordinate system of the target object; (d) constructing a feature location data file containing at least the feature location image data, the second geolocation data and the second heading angle data; (e) sending the reference and feature location data files from the imaging device to a computer system; (f) computing a Cartesian coordinate offset between the feature location and the reference location, wherein the offset is a function of coordinates in the first and second geolocation data and heading angles in the first and second heading angle data; (g) retrieving three-dimensional model data of the target object from a three-dimensional model database; (h) displaying a three-dimensional model image of at least a portion of the target object with a viewpoint that is a function of the offset computed in step (f) and the field-of-view angle of the imaging device, the three-dimensional model image representing the three-dimensional model data retrieved from the three-dimensional model database; and (i) displaying a feature location image of the same portion of the target object as an overlay or background to the three-dimensional model image, the feature location image representing at least portions of the feature location image data, wherein steps (f) through (i) are performed by the computer system. This method may further comprise: (g) selecting a point in the displayed feature location image; (h) retrieving additional three-dimensional model data from the three-dimensional model database in response to the selecting; and (i) displaying symbology representing the retrieved additional three-dimensional model data.

A further aspect of the subject matter disclosed in detail below is a system comprising a digital camera, a GPS receiver, a digital compass, a display screen, a non-transitory tangible computer-readable storage medium storing three-dimensional model data of a target object, a three-dimensional visualization software application, and an offset computation software application, and a computer system configured to perform the following operations: (a) computing a Cartesian coordinate offset between a feature location of the digital camera and a reference location of the digital camera using offset computation software application, wherein the offset is a function of coordinates in geolocation data acquired by the GPS receiver and heading angle data acquired by the digital compass during capture of reference and feature location image data by the digital camera; (b) retrieving the three-dimensional model data of the target object from the non-transitory tangible computer-readable storage medium; (c) using the three-dimensional visualization software application to control the display screen to display a three-dimensional model image of at least a portion of the target object with a viewpoint that is a function of the offset computed in operation (a) and the field-of-view angle of the digital camera, the three-dimensional model image representing the three-dimensional model data retrieved from the three-dimensional model database; and (d) using the three-dimensional visualization software application to control the display screen to display a feature location image of the same portion of the target object as an overlay or background to the three-dimensional model image, the feature location image representing at least portions of the feature location image data captured by the digital camera. In some embodiments, the system further comprises a housing that supports the GPS receiver, the digital camera, the digital compass, the display screen, and the computer system. In other embodiments, the computer system comprises first and second processors, wherein the first processor is connected to receive geolocation data from the GPS receiver, heading angle data from the digital compass, and image data from the digital camera, and the second processor performs operations (a) through (d), and the system further comprises a housing that supports the GPS receiver, the digital camera, the digital compass, the display screen, and the first processor, but not the second processor. In the latter case, the housing may be located in proximity to the target object, while the second processor is located at an operations center.

Other aspects of methods for identifying parts of a target object using geotagged photographs and 3-D visualization are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

DETAILED DESCRIPTION

Figure 1:
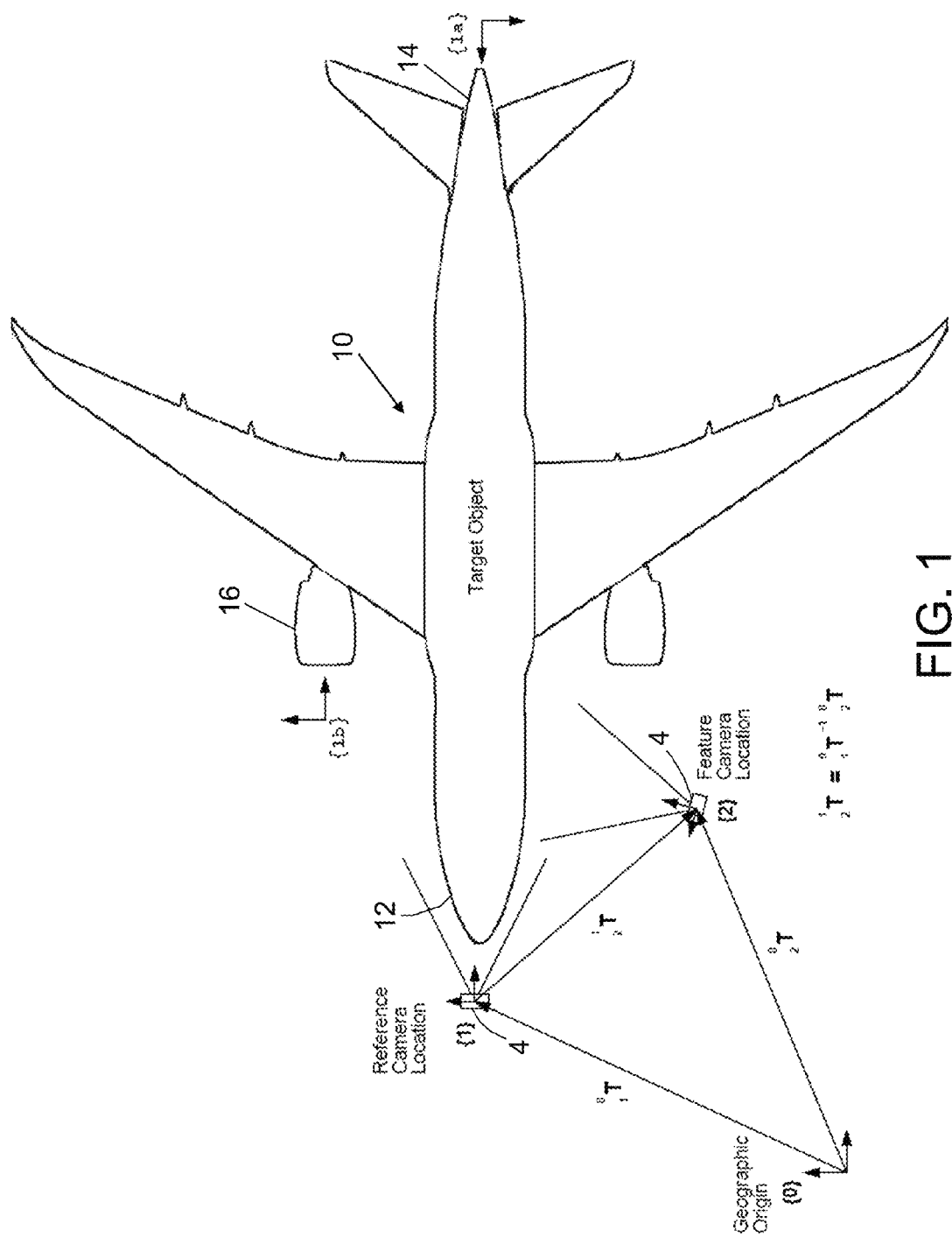
FIG. 1 shows an airplane in relation to respective camera locations for capturing a reference location image of the airplane and an image of a feature or part of interest on the airplane in accordance with one embodiment of the process disclosed herein. The camera locations correspond to respective vertices of the triangle in the coordinate system transformation diagram which is part of FIG. 1.

Illustrative embodiments of a method for identifying parts of a target object using a geolocation-capable hand-held imaging device and 3-D visualization are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, methods for identifying parts of interest on an airplane will be described in detail below. However, the concept of identifying parts of a target object using a geolocation-capable hand-held imaging device and 3-D visualization can also be used for identifying parts of structures other than airplanes.

It is common practice during airplane maintenance operations that on-site maintenance personnel communicate with an off-site expert, including sending digital photographs of the area of interest, captured using a hand-held imaging device of consumer type, such as mobile phones and tablet computers. It is common for hand-held imaging devices to have an integrated GPS receiver, which enables the inclusion of geographical identification data into the digital image metadata fields (usually in the standard EXIF format). The integration of this type of data within a digital image (referred to herein as "geotagging") can be very useful in locating, in terms of latitude and longitude (and optionally altitude), where a photograph was taken. The hand-held imaging device may also incorporate a digital compass (e.g., a miniaturized magnetometer incorporated in an integrated circuit), which enables the aim direction (i.e., heading) of the imaging device to be determined (which information may be added to the aforementioned EXIF file). The heading of the imaging devices may be determined in other ways. For example, in some GPS applications the heading can be computed using a series of prior location readings (i.e., providing a motion direction vector). It is also possible to use a gyroscope (IMU) to get a relative heading angle—with or without a magnetometer. However, without additional context about the coordinates of the target object, this metadata is not sufficient to determine where the location of the camera relative to the target object when the image was captured.

Process Overview:

The overall process described below enables image data and metadata, captured on-site by non-expert personnel using consumer-level equipment, to be used by on-site or off-site analysts for determination of part information (e.g., part identification). The process involves the use of common GPS-equipped hand-held imaging devices to acquire reference and feature digital photographs with embedded metadata (that includes geolocation and camera settings). The metadata in these image files can be used to generate relative Cartesian (X,Y,Z) location (position and orientation) information that can be transformed into the native local coordinate system of the target object. This computed location data can then be used by a 3-D visualization application with access to a 3-D model (e.g., a CAD model) of the target object to provide an estimated 3-D viewpoint in order to display a 3-D model of a feature in the imaged region of interest. Using the feature digital photograph as a background or overlay image in the 3-D visualization environment allows this estimated viewpoint to be further refined (if necessary) using interactive or automatic adjustment. The coordinates of the feature in region of interest can be determined, and the identities (part numbers, etc.) of items or parts of interest can then be extracted from the 3-D model of the target object (e.g., an airplane). For example, the modeling software module may include the ability to display the name of the associated part when a particular position on the displayed image of the airplane is selected (e.g., by pointing at that position using a cursor).

Process Details:

A process for identifying parts of an airplane at a site using a geolocation-capable hand-held imaging device will now be described in detail for the purpose of illustration. However, it should be appreciated that the concept embodied in such process can also be used to identify parts on a target object other than an airplane.

FIG. 1 shows an airplane 10 in relation to respective locations of a hand-held imaging device 4. The pairs of orthogonal arrows located at the vertices of the triangle in the lower left-hand portion of FIG. 1 represent respective coordinate frames of reference, including: a coordinate system {0} (e.g., an Earth-centered coordinate system) having a geographic origin; a coordinate system {1} of the hand-held imaging device 4 having an origin positioned at a known location (referred to hereinafter as the "reference camera location"), such as the origin of the airplane coordinate system (which origin may be located a certain distance in front of the nose 12 of the airplane 10 or elsewhere), and having an axis aligned with one axis of the airplane coordinate system; and a coordinate system {2} of the hand-held imaging device 4 having an origin positioned at an unknown location (referred to hereinafter as the "feature camera location") relative to the airplane coordinate system and an axis having an unknown orientation relative to the airplane coordinate system.

Referring to FIG. 1, the process in accordance with one embodiment begins at the physical location of the airplane 10. The on-site maintenance personnel (not shown in FIG. 1) can use the hand-held imaging device 4 to capture a digital photograph reference location image of the airplane 10 from the reference camera location. In the scenario depicted in FIG. 1, the reference camera location is near the nose 12 of the airplane 10. Other easily identifiable areas such as the tail 14 or engine 16 may also be used for reference purposes, in which cases the reference camera location would be respectively located near the tail 14 or near the engine 16. The coordinate systems (i.e., frames of reference) having origins at such alternate reference camera locations and an axis aligned with an axis of the airplane coordinate system are respectively labeled {1a} and {1b} in FIG. 1.

Figure 2:
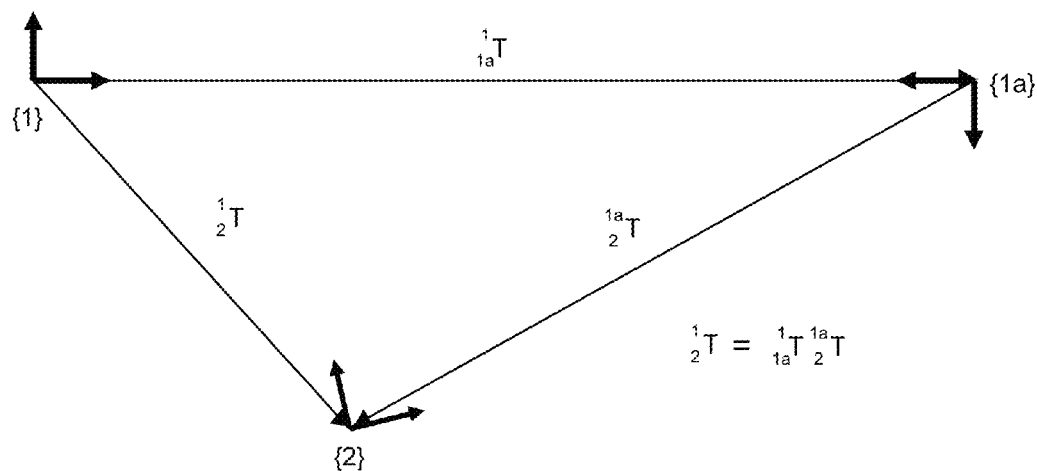
FIG. 2 shows a coordinate system transformation diagram which can be used in situations where the reference camera location does not coincide with the origin of the coordinate system of the airplane depicted in FIG. 1.

FIG. 2 is a diagram showing a coordinate system transformation which can be used in situations where the reference camera location does not coincide with the origin of the coordinate system of the airplane depicted in FIG. 1. The pairs of orthogonal arrows located at the vertices of the triangle in FIG. 2 represent respective coordinate frames of reference, including: the coordinate system {1} of the hand-held imaging device 4 having an origin positioned at a known location relative to the nose 12 of the airplane 10 and having an axis aligned with one axis of the airplane coordinate system; a coordinate system {2} of the hand-held imaging device 4 having an origin positioned at an unknown feature camera location relative to the airplane coordinate system and an axis having an orientation defined relative to the global coordinate system (which is initially an unknown orientation relative to the airplane coordinate system); and the coordinate system {1*a*} of the hand-held imaging device 4 having an origin positioned at a known location relative to the tail 14 of the airplane 10 and having an axis aligned with one axis of the airplane coordinate system. Since coordinate system {1*a*} has a known location relative to the coordinate system {1} (e.g., from a CAD model or other type of 3-D measurement), the location of the coordinate system {2} relative to the coordinate system {1*a*} can be determined from the GPS position and heading information, after which the location of coordinate system {2} relative to coordinate system {1} can be determined using transformation matrix operations as described in FIG. 2 and in more detail below.

If more than one reference image is acquired (for example, by placing the camera at the origins of the coordinate systems {1} and {1*a*} depicted in FIG. 2), the overall accuracy of the feature location estimate can be improved. This involves multiple uses of the offset calculation process (one for each reference). During image capture, the hand-held imaging device 4 records the GPS latitude and longitude, altitude, as well as camera heading (aim direction), in addition to camera settings (including the lens field-of-view or zoom angle), into the metadata portion of the digital photograph's file structure. On many of the current hand-held imaging devices, this metadata is stored in EXIF format, but the method can be modified to work with other formats as well.

After the reference location image has been captured, the on-site person uses the hand-held imaging device 4 to capture one or more additional digital photographs of feature (s) or part(s) of interest on (or near) the airplane 10 while the hand-held imaging device 4 is at the feature camera location. Again the hand-held imaging device 4 records the GPS latitude and longitude, altitude, as well as camera heading, in addition to camera settings in the metadata fields of respective digital image files.

Figure 3A:
FIGS. 3A and 3B are representations of simulated on-site photographs showing an image (FIG. 3A) captured while the camera is at the reference camera location indicated in FIG. 1 and an image (FIG. 3B) captured while the camera is at the feature camera location indicated in FIG. 1.
Figure 3B:
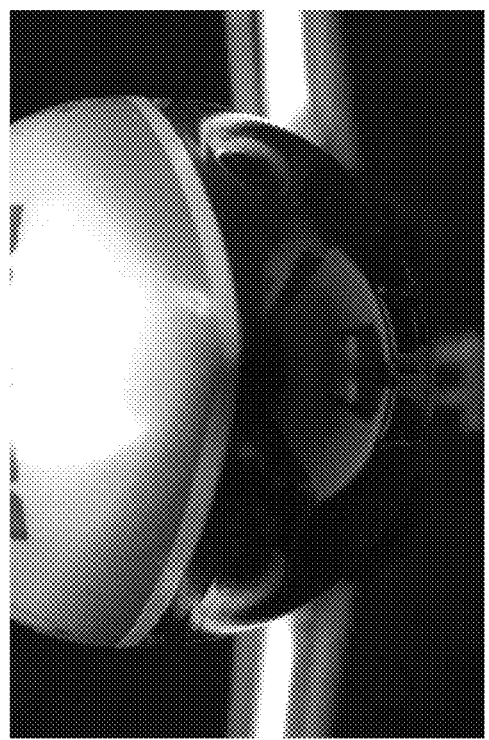

FIGS. 3A and 3B are representations of simulated on-site photographs showing a reference image (FIG. 3A) captured while the camera is positioned at the reference camera location and oriented as indicated by coordinate system {1} in FIG. 1, and a feature image (FIG. 3B) captured while the camera is positioned at the feature camera location and oriented as indicated by coordinate system {2} in FIG. 1. The reference image may be used as an overlay in the initial alignment process to confirm that the reference camera location was properly captured by the on-site technician and if it turns out to be slightly misaligned, an expert analyst can adjust the viewpoint in the 3-D visualization application and record the corrected reference camera location.

In some situations, the digital image files corresponding to the images seen in FIGS. 3A and 3B are then sent to an off-site expert for analysis. In other situations, the digital image files are used at the on-site location (and potentially on the computing device used to capture the image data and metadata, if it has the required processing and graphics capabilities). The digital image files are loaded into an application program that computes the Cartesian coordinates of the feature camera location(s) relative to the coordinate system {1} (which has a known location relative to the airplane coordinate system) by using the metadata stored in the reference and feature location image files. If the reference camera location does not coincide with the origin of the airplane's coordinate system, then an additional coordinate system transformation (such as the transformation indicated by the equation in FIG. 2) should be performed to establish the location of the coordinate system {2} relative to the coordinate system of the airplane. When completed, this process provides location data defined in the local coordinate system of the airplane. (Details of the local coordinate system calculations will be provided below.)

Figure 4B:
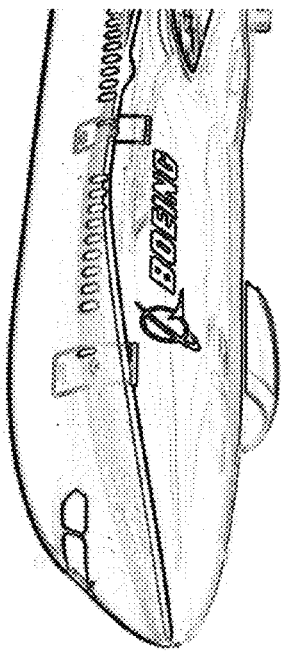
FIGS. 4A through 4D present respective views of the front end of an airplane which can be displayed using a 3-D visualization process, such views including: (a) a 3-D model before setting the viewpoint (FIG. 4A); (b) an overlay outline feature location image (FIG. 4B); (c) a 3-D model with an overlay image and with the viewpoint set (FIG. 4C); and (d) a 3-D model at a proper viewpoint with the overlay turned off (FIG. 4D).
Figure 4D:
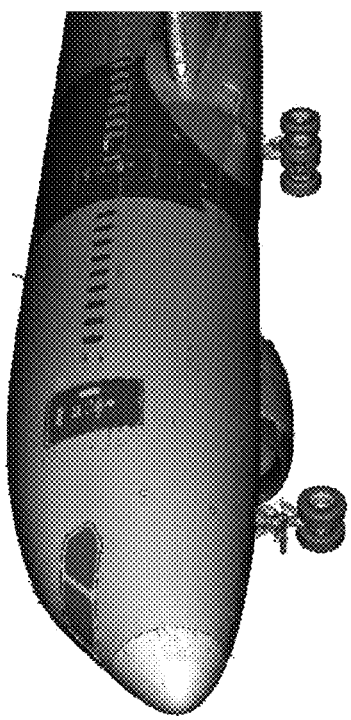
Figure 4A:
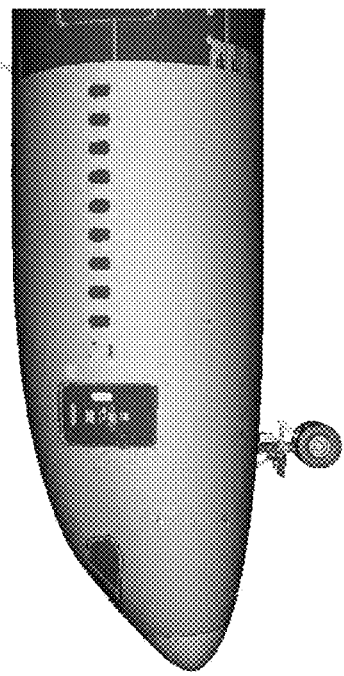

This relative location data, which is defined in the coordinate system of the airplane (or other target object), is then used by a 3-D visualization application to set position and orientation of the virtual viewpoint, along with the camera's field-of-view setting from the feature photograph metadata. First, the expert analyst loads an existing 3-D model (generated by a CAD system or some other 3-D modeling process) into the 3-D visualization system. FIG. 4A shows a view of the visualization interface after loading of a 3-D model and before setting the viewpoint. The 3-D visualization application then sets the position and orientation of the virtual viewpoint using the relative location data. This combination of computed viewpoint and 3-D models displayed in the virtual environment produces an approximate viewpoint location of where the feature photograph was taken defined in terms of the target object coordinate system. The expert analyst can then load the feature location image file into the 3-D visualization system as a background or overlay image. If the overlay option is desired, the system can produce a semi-transparent outline feature location image using edge-detection techniques. Such an outline feature location image is shown in FIG. 4B. The analyst may then overlay the outline feature location image onto a 3-D image of the airplane having a viewpoint set using the metadata, as shown in FIG. 4C, and then compare the set viewpoint to the outline feature location image, and if necessary, perform minor location adjustments to the virtual viewpoint to precisely align the outline feature location image with the virtual 3-D model.

Preliminary testing of the overlay process for fine viewpoint adjustment was performed using complete 3-D models of an airplane, as shown in FIG. 4A. Photographs of a small-scale airplane model were used to simulate the full-scale airplane. An outline image was generated from the photographs (FIG. 4B) and overlaid onto the 3-D model (FIG. 4C), after which minor translation/rotation adjustments of the 3-D viewpoint were performed to refine the alignment. FIG. 4D shows a view of the visualization interface displaying the 3-D model image with the proper viewpoint and with the overlay turned off.

Figure 4C:
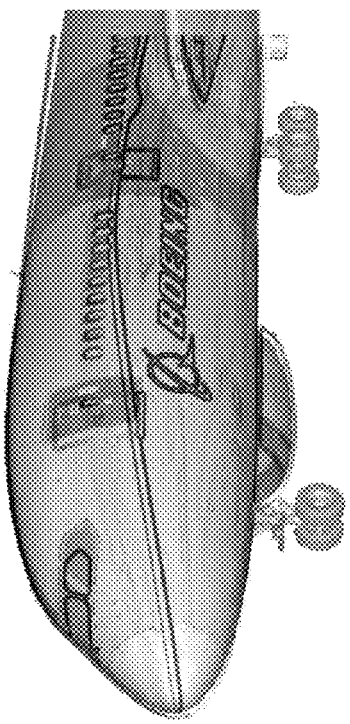

When the 3-D viewpoint of the 3-D model in the virtual environment is aligned with the background or overlay photograph (as shown in FIG. 4C), the analyst can select the 3-D model part of interest and acquire the part identification number or other part information from the 3-D model data or model database. On some occasions, it may be obvious which part of photograph contains the feature of interest (which allows for straightforward part selection), especially if the photograph is showing damage, but in other situations the region of interest may not be as clear to the analyst. There are several options to address this, including using a central reticle (e.g., crosshair) in the 3-D display that indicates where the camera was aimed, another approach may be to have the on-site person draw a circle around the part of interest in the feature location image. These visual elements can then be used by the analyst to assist in the interactive part selection process.

Figure 5A:
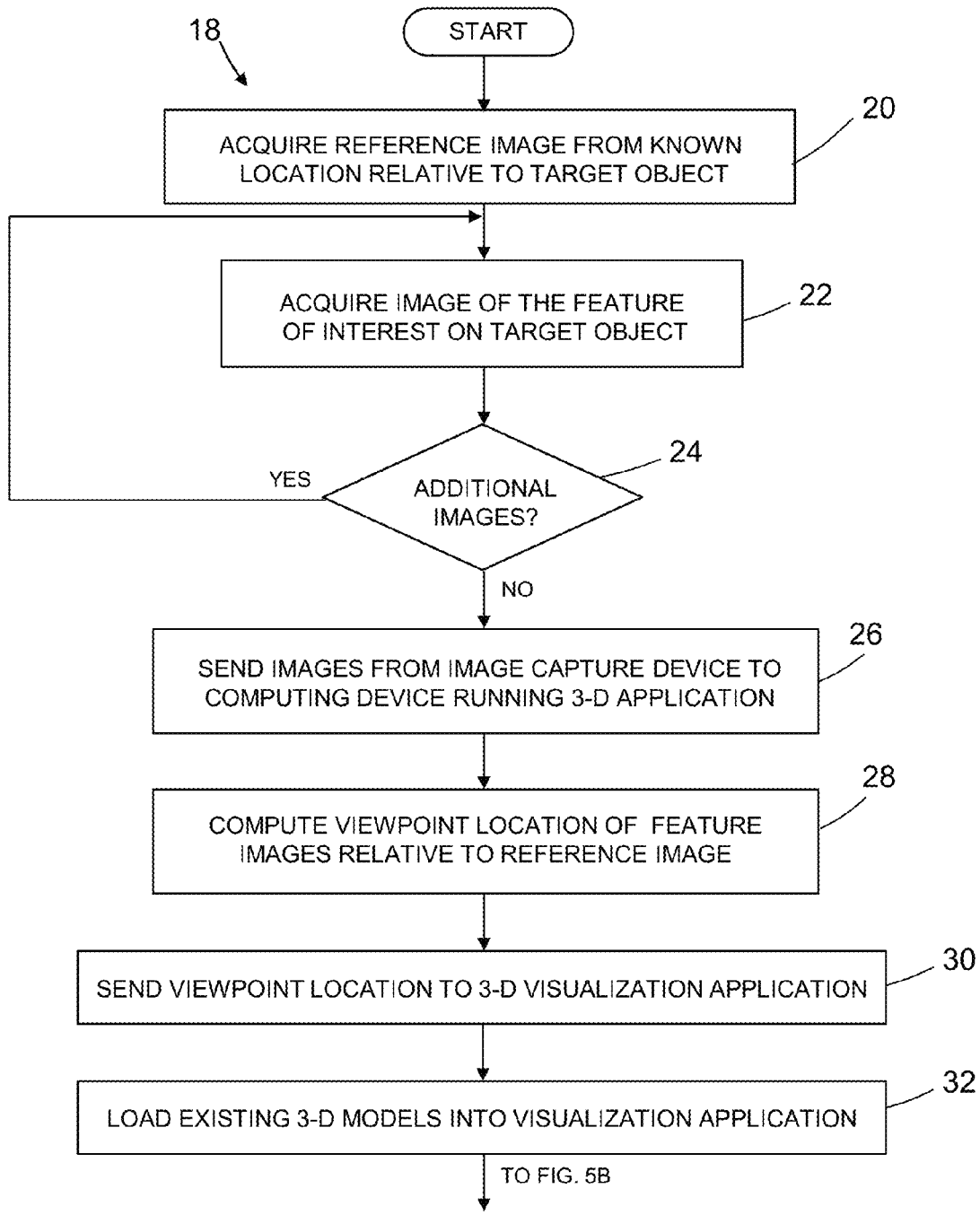
FIGS. 5A and 5B present respective portions of a flowchart identifying steps of a process for identifying a part of a target object using 3-D visualization, 3-D model data, and geotagged photographs captured using a geolocation-capable hand-held imaging device.
Figure 5B:
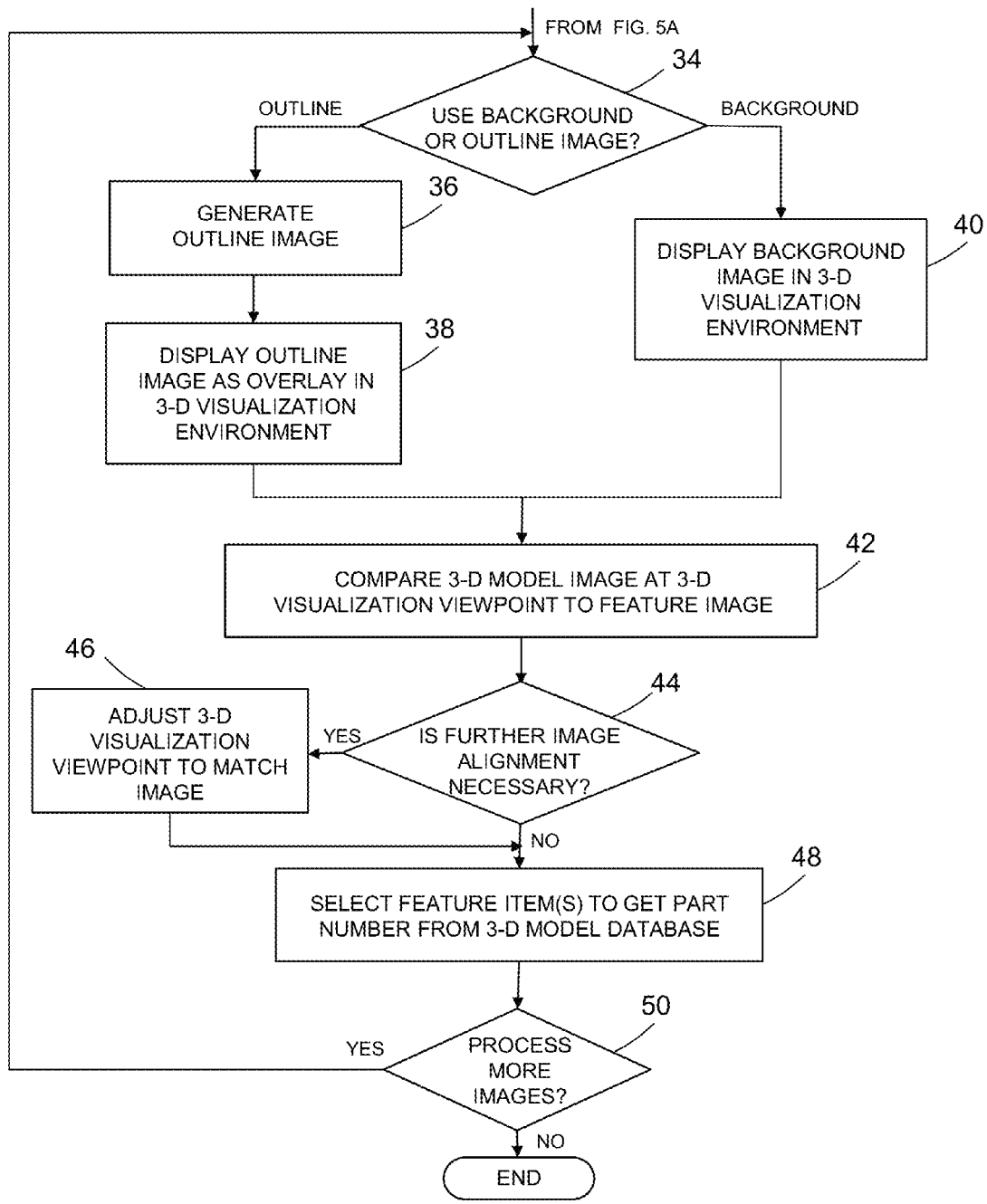

The steps of a part identification process 18 in accordance with one embodiment are summarized in the flowchart presented in FIGS. 5A and 5B. Referring to FIG. 5A, the reference location image is acquired while the camera is at a known location (i.e., the reference camera location) relative to the coordinate system of the target object (step 20). Then the feature location image is acquired while the camera is at an unknown location (i.e., the feature camera location) relative to the coordinate system of the target object (step 22). A decision is then made whether additional feature location images are to be acquired or not (step 24). If additional feature location images are desired, the process returns to step 22. If additional feature location images are not wanted, image acquisition is terminated and the acquired reference and feature location images are sent to a computer system that hosts a 3-D visualization software application (step 26). First, the computer system uses the metadata to compute the viewpoint location of each feature location image relative to the coordinate system of the reference camera location using coordinate transformations (step 28). This viewpoint location is then sent to the 3-D visualization application (step 30). In addition, a 3-D model of the target object is loaded into the 3-D visualization application (step 32).

Referring to FIG. 5B, a decision is then made by the expert whether to use a background image mode or an overlay image mode (step 34). If the expert selects an overlay image mode, an edge detection software application is used to generate an outline (or semi-transparent) feature location image (step 36) and then that image is displayed as an overlay in the 3-D visualization environment (step 38). The expert then compares the 3-D model image at the 3-D visualization viewpoint location to the outline feature location image (step 42). Alternatively, if the expert selects the background image mode, the feature location image is displayed as a background image in the 3-D visualization environment (step 40). The expert then compares the 3-D model image at the 3-D visualization viewpoint location to the background feature location image (step 42). A determination is then made by the expert whether further image alignment is desirable or not (step 44). If further image alignment is desirable, then the expert can adjust the 3-D environment viewpoint to match the feature location image (step 46). If the alignment of the 3-D model image and feature location image is good enough, then no adjustment is needed.

It may be possible to use an automatic technique to do the fine alignment adjustment. Such an automatic alignment technique may involve the use of image processing methods, such as edge detection of the virtual image, and an optimization method to minimize the difference between the edges detected in the feature photograph and the edges detected in the virtual image. This is likely to be an iterative type of solution. Iterative types of solutions like this need an initial location estimate that is relatively close to final solution to have a chance of succeeding in a reasonable amount of time. The initial location estimate provided by the GPS-plus-heading method described herein is suitable for use in an iterative alignment process.

Once the images are properly aligned, the aligned images can be used to select an area in the 3-D model image in order to retrieve part identification data (i.e., an identification number for a part on or under the surface of the selected area) from a 3-D model database (step 48). The expert then decides whether to process more images (step 50). If the expert decides that another image should be processed, the process returns to step 34. If the expert decides to not process another image, process 18 is terminated.

To provide further detail concerning steps 20 and 22, the methodology in accordance with one embodiment may comprise the following steps: (a) placing the imaging device at a known reference location relative to a coordinate system of a target object; (b) directing the imaging device at the reference location toward the target object; (c) acquiring reference location image data by taking a reference digital photograph while the imaging device at the reference location is aimed at the target object; (d) acquiring first geolocation data and first heading angle data while the imaging device is located at the reference location; (e) storing the reference location image data with the first geolocation data and first heading angle data in a reference location image file; (f) placing the imaging device at an unknown feature location; directing the imaging device at the feature location toward an area on the target object; (g) acquiring feature location image data by taking a feature digital photograph while the imaging device at the feature location is aimed at the area of the target object; (h) acquiring second geolocation data and second heading angle data while the imaging device is located at the feature location; and (i) storing the feature location image data with the second geolocation data and second heading angle data in a feature location image file.

Determination of Local Coordinates

The coordinate transformation calculation mentioned above first involves converting latitude, longitude, and altitude into a Cartesian position difference between the reference and feature camera locations. (If the altitude data is not available, the process may assume that the reference camera location and area of interest on the target object are at the same altitude.) This Cartesian position difference can be computed by using any of several well-known processes, the simplest of which assumes that the Earth is a perfect sphere, which allows constant radius equations to be used. The latitude and longitude values from the reference location image and the feature location image are converted into difference angles and then into Cartesian X, Y, Z values using the following trigonometric relationships:

$$\Delta Lat\_ang = Lat2 - Lat1$$

$$\Delta Lon\_ang = Lon2 - Lon1$$

$$\Delta x = 2 * rad\_earth * \sin(\Delta Lat\_ang/2)$$

$$\Delta y = 2 * rad\_earth * \sin(\Delta Lon\_ang/2)$$

$$\Delta z = Altitude2 - Altitude1 \qquad (1)$$

where Lat1, Lon1 and Altitude1 are the latitude, longitude and altitude respectively of the reference camera location; Lat2, Lon2 and Altitude2 are the latitude, longitude and altitude respectively of the feature camera location; rad_earth is the radius of the Earth (approx. 6371 km); $\Delta Lat\_ang$ and $\Delta Lon\_ang$ are the latitude and longitude difference angles respectively; and $\Delta x$, $\Delta y$, and $\Delta z$ are the Cartesian values for the X, Y, Z differences respectively.

Since the shape of the Earth deviates from a perfect sphere, this set of equations computes only an approximate difference. More accurate results can be achieved using an ellipsoid with local area corrections. In addition, there are likely other satellite-based corrections that could be applied to improve accuracy, but finding the correct radius of the Earth for a specific location or correcting data from satellite measurements is not the purpose of this disclosure. Techniques to accomplish position accuracy improvement have been published elsewhere and can be applied to this step without changing the overall concept presented here.

The heading angle difference can be computed using subtraction as follows:

$$\Delta h = \text{heading2} - \text{heading1} \quad (2)$$

where heading1 and heading2 are the respective heading angles of the camera at the reference and feature camera locations.

After determining the X,Y,Z position and heading angle differences, these values can be used to generate a homogeneous transformation matrix that represents the location (position and orientation) offset between the reference camera location and the feature camera location as follows:

$$T = \begin{bmatrix} \cos(\Delta h) & -\sin(\Delta h) & 0 & \Delta x \\ \sin(\Delta h) & \cos(\Delta h) & 0 & \Delta y \\ 0 & 0 & 1 & \Delta z \\ 0 & 0 & 0 & 1 \end{bmatrix} \quad (3)$$

In the scenario represented by the triangle in FIG. 1, the transformation matrix T in Eq. (3) is $^1_2T$, which transforms the location in coordinate system $\{2\}$ into a corresponding location in the coordinate system $\{1\}$, can be computed as follows:

$$_2^1T = {}^0_1T^{-1}\,{}^0_2T \quad (4a)$$

where $^0_1T$ is the transformation matrix which transforms the location in coordinate system $\{1\}$ into a corresponding location in the coordinate system $\{0\}$, and $^0_2T$ is the transformation matrix which transforms the location in coordinate system $\{2\}$ into a corresponding location in the coordinate system $\{0\}$. The resulting transformation matrix $^1_2T$ can be used in the form shown in Eq. (3), or in other equivalent formats, to set the virtual camera viewpoint in a 3-D virtual environment.

Note that FIG. 1 shows the ideal situation where the camera location for the reference photograph is aligned with the origin of the coordinate system of the airplane 10, but it may not always be possible to capture the reference photograph at this location. In situations where the reference camera location does not coincide with the origin of the coordinate system of the target object, an additional transformation multiplication can be used to perform this alignment. FIG. 2 shows an example of this situation, where the reference photograph was captured at the tail 14 of the airplane 10 instead of at the nose 12, with the coordinate system of the hand-held imaging device 4 being identified by $\{1a\}$ and $\{1\}$ respectively. To convert the result into the coordinate system $\{1\}$, the transformation matrix shown in Eq. (3) is pre-multiplied by the known transform describing the location of coordinate system $\{1a\}$ relative to coordinate system $\{1\}$, as follows:

$$_2^1T = {}^1_{1a}T\,{}^{1a}_2T \quad (4b)$$

where $^1_{1a}T$ is the transformation matrix which transforms the location in coordinate system $\{1a\}$ into a corresponding location in the coordinate system $\{1\}$, and $^{1a}_2T$ is the transformation matrix which transforms the location in coordinate system $\{2\}$ into a corresponding location in the coordinate system $\{1a\}$.

In the foregoing description, the pitch and roll angles are set to zero, since the current EXIF format does not support those directly. In the future when those become available, Eq. (3) would be modified to include roll and pitch angles, in addition to heading (yaw). In that situation, the relative transformation matrix equation becomes:

$$T = \begin{bmatrix} \cos(C)^*\cos(B) & -\sin(C)^*\cos(A) + \cos(C)^*\sin(B)^*\sin(A) & \sin(C)^*\sin(A) + \cos(C)^*\sin(B)^*\cos(A) & \Delta x \\ \sin(C)^*\cos(B) & \cos(C)^*\cos(A) + \sin(C)^*\sin(B)^*\sin(A) & -\cos(C)^*\sin(A) + \sin(C)^*\sin(B)^*\cos(A) & \Delta y \\ -\sin(B) & \cos(B)^*\sin(A) & \cos(B)^*\cos(A) & \Delta z \\ 0 & 0 & 0 & 1 \end{bmatrix} \quad (5)$$

where A is roll angle, B is pitch angle and C is yaw angle (equivalent to the heading angle $\Delta h$ in Eq. (2)).

Use Cases

All of the use cases briefly described below are related scenarios in which the target object (in this case, as airplane) is situated at a geographical coordinate position that has acceptable GPS reception (usually outdoors). Working indoors may block the GPS signal, which would limit the methodology described in this disclosure. However, nothing in this disclosure should limit the invention solely to outdoor use.

(1) In a first use case, a service technician addressing an airplane-on-ground situation is located on-site and has been assigned the task of extracting assembly information and part numbers for a damaged area on the airplane. That person would take digital photographs and send them to an expert analyst for review. Using the methodology described above, the expert analyst can identify the parts appearing in the photograph by matching the damage location with a 3-D model for that same area. Currently, that matching activity is highly related to the level of experience of the expert analyst and his/her capability to extract data with little or no reference from the existing support datasets (manuals, technical drawings and similar documentation).

(2) In a second use case, an airline mechanic is making a walk-around check of the airplane between two flights and spots a potential problem area that needs to be addressed within a specific allotted time. Two options exist in that case depending on the severity of the problem at hand: immediate action or sending a service request to the airplane manufacturer. In both cases, taking digital geotagged photographs will enable a person in front of the airplane to immediately relate the camera location to a 3-D model of the airplane, assuming the device has the 3-D model dataset installed and is capable of displaying the 3-D model data. If not, sending the photographs to an expert analyst for a quick review is the second option and by using the methodology disclosed herein, it is possible to obtain quick feedback on the severity of the problem.

(3) In a third use case, a pre-delivery inspection (i.e., quality control) technician at a delivery center performs an outside check of the airplane and spots some discrepancy, whether it is technical or in appearance. An inspection is scheduled in a not distant time frame, so there is limited time for corrective action. The technician takes the geotagged photographs and launches a 3-D model visualization session to compare the photographs to that specific airplane line number 3-D model. Interrogation helps the identification of the troubled part(s) and the new part is immediately located and sourced for a replacement of the defective one.

In accordance with some embodiments, the method comprises: acquiring reference location image data, first geolocation data and first heading angle data using an imaging device directed toward the target object and located at a known reference location relative to a coordinate system of the target object; and acquiring feature location image data, second geolocation data and second heading angle data using an imaging device directed toward an area on the target object and located at an unknown feature location relative to the coordinate system of the target object. Then, a Cartesian coordinate offset is computed between the feature location and the reference location, wherein the offset is a function of coordinates in the first and second geolocation data and heading angles in the first and second heading angle data. Thereafter, three-dimensional model data of the target object is retrieved from a three-dimensional model database and a three-dimensional model image of at least a portion of the target object is displayed with a viewpoint that is a function of the computed offset computed and the field-of-view angle of the imaging device. A feature location image of the same portion of the target object is concurrently displayed as an overlay or background to the three-dimensional model image, the feature location image representing at least portions of the feature location image data. The displayed feature location image may comprise an outline extracted from the feature location image data using edge detection. The analyst can adjust a position of the three-dimensional model image to align it with the feature location image on the display screen. If the images are properly aligned, the analyst may select a point in the displayed feature location image based on the damage shown in the feature location image. The computer system is configured to retrieve additional three-dimensional model data from the three-dimensional model database in response to the selection. Symbology (e.g., alphanumeric symbols) representing the retrieved additional three-dimensional model data is displayed on the display screen of the computer system. The additional three-dimensional model data may comprise part identification data that identifies a part of the target object associated with an area of the three-dimensional model image containing the selected point and/or coordinates of the selected point in the coordinate system of the target object.

In summary, the methodology disclosed above comprises the following features: (1) the location data is defined in the local coordinate system of the target object; (2) the method uses consumer level hardware for image capture and GPS data acquisition; and (3) the processing results integrate with 3-D modeling applications to set a viewpoint to allow part selection.

Some elements of the method disclosed above include the following:

(1) Calibration of the hand-held imaging device to the target object is accomplished using geolocation and camera setting information.

(2) The coordinates of the location of an item of interest are converted into target object coordinates using coordinate system transformation processes.

(3) A virtual camera in a 3-D visualization environment may be moved to a calculated location and the field-of-view of the virtual camera can be set to match the photograph;

(4) A 3-D visualization environment is used to interactively re-adjust the viewpoint of the virtual camera, if needed.

(5) An analyst may use this view of the 3-D models to select feature locations to determine associated part numbers.

The solution presented here is intended to work with consumer level hardware that will likely be available on-site, and can be used with minimal training. The only requirement beyond knowing how to take a digital photograph is that the on-site person take a reference photograph of some identifiable part of the target object. This approach greatly simplifies the process compared to other measurement-based systems. The method described here provides a reasonably good initial estimate of the alignment location, with only minor adjustments needed (if at all). With this methodology, a user may manipulate the viewpoint of a 3-D model instead of walking around a physical space. Walking around in the physical space may be difficult to do when limitations in the physical environment (like obstacles or height constraints) preventing the user from reaching the required alignment location. Once the geotagged photographs have been acquired on-site, the analysis can take place at a later time and at a different location with a 3-D visualization-capable device. Further access to the physical target object is not required.

Advanced versions of the system disclosed herein may include loading the 3-D visualization application into the hand-held imaging device, which would enable on-site analysis personnel to perform the entire task. In addition, an estimated region of uncertainty may be displayed on the 3-D model.

Figure 6:
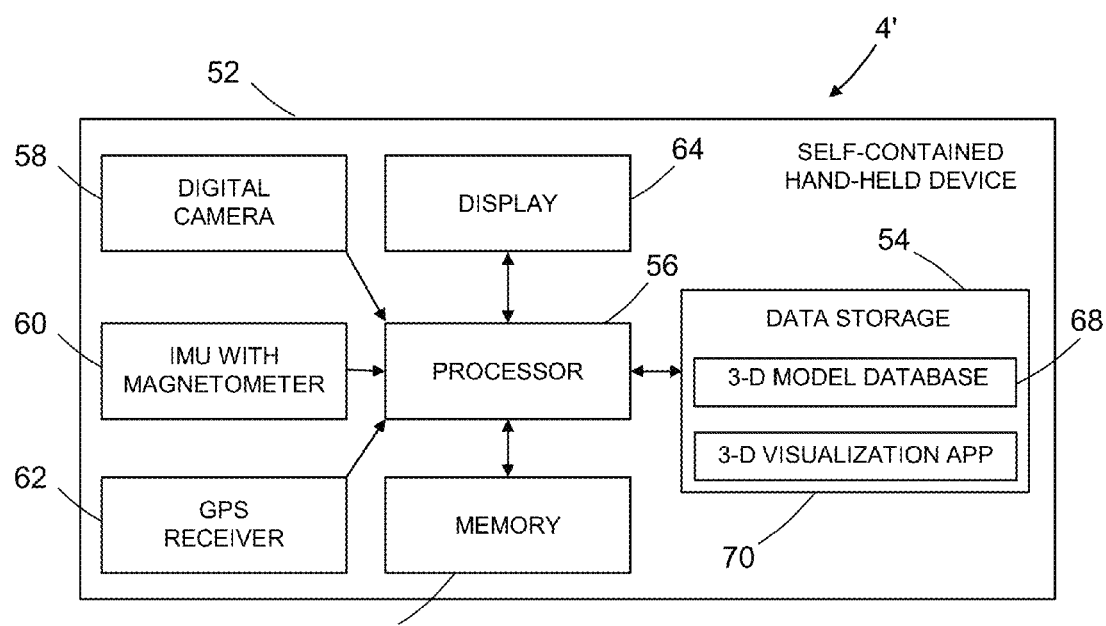
FIG. 6 is a block diagram identifying major components of a self-contained, geolocation-capable, hand-held imaging device having a 3-D visualization software application in accordance with one embodiment, Reference will hereinafter be made to the drawings in which similar elements in different drawings bear the same reference numerals.

FIG. 6 is a block diagram identifying major components of a self-contained, geolocation-capable, hand-held imaging device 4' in accordance with one embodiment. The hand-held imaging device 4' may take the form of a tablet PC or a smartphone capable of acquiring GPS data, image data, and interacting with 3-D models. The major components of hand-held imaging device 4' comprise a housing 52 supporting the following additional components: data storage 54, a processor 56, a digital camera 58, an inertial measurement unit (IMU) 60 having a magnetometer, a GPS receiver 62, a touch-enabled display screen 64, and working memory 66. The contents of data storage 54 comprise a 3-D model database 68 and a 3-D visualization application 70. The processor 56 receives image data from the digital camera 58, heading angle data from the IMU 60 and GPS data from the GPS receiver 62. In the embodiment depicted in FIG. 6, the software for computing the offset transformation matrix is embedded in the 3-D visualization application 70. The processor 56 computes the offset transformation matrix using the GPS and heading angle data. That offset transformation matrix is then used to provide an initial viewpoint in the 3-D visualization environment displayed on display screen 64. If that initial viewpoint results in a feature location image that is not aligned with the 3-D model image of the target object, the expert analyst may manually make small adjustments until the feature location image is properly registered with the 3-D model image.

In an alternative embodiment, the hand-held imaging device has a stand-alone offset computation application and does not have a 3-D visualization application. Such a device could be used to give users of smartphones (or other imaging devices without 3-D visualization capabilities) an on-thespot estimate of the coordinates of the feature of interest on the target object, which could be used to provide approximate relative position measurements.

Embedding the offset computation function into the 3-D visualization application is the most seamless approach if the developer has access to the source code for the 3-D visualization application. If the developer does not have access—such as someone (non-developer) who wants to use it with a commercial off-the-shelf (COTS) 3-D visualization application—some type of plug-in approach would be another option. Some applications have externally accessible application program interfaces (APIs) that allow users to connect to other applications (using plug-ins or add-in modules, etc.), but for those applications that do not have that type of interface, the developer can still use the concept by having a separate stand-alone offset computation application that computes the offset transformation matrix and saves it to a file, which file can be loaded by the user into the 3-D visualization application.

With respect to using 3-D graphics without location assistance like the type provided here, the difficulty in finding a specific part in a 3-D visualization environment should not be underestimated. For large objects like airplanes, an analyst working with photographs as a visual input might not even know which side of an airplane is being shown, or which one of potentially dozens of similar parts located in different positions around the airplane are in the view. Even when photographs can be used as an overlay, it is still very challenging to align the 3-D view with the photograph, since separate adjustments such as dolly and zoom have similar visual effects on the view, but end up with different positioning results. Working to achieve a reasonable solution in this manner is iterative and can be very tedious.

While this disclosure has focused mainly on airplane-related tasks, it is not limited to that specific field. Other manufacturing, architectural, and construction applications that use 3-D models could take advantage of this concept.

As mentioned earlier, the method disclosed herein benefits areas such as: flight line operations, airplane-on-ground situations and inspections. Assessing an airplane for repairs or during an accident investigation may involve analysis of multiple digital photographs taken by people who are not experts in 3-D modeling, which can cause difficulties with current processes in identifying parts, since it can be challenging without proper location context. But with the process described herein, those photographs can be sent to experts to help determine which parts are involved, even when the location context is not clear using pure visual inspection. This ability to use a series of images with embedded location and camera setting data, acquired by a variety of on-site witnesses with common consumer-level equipment (e.g., a typical smartphone), to provide relative location information, can reduce travel costs and increase the quantity of useful data available for analysis.

While methods for identifying parts on target objects using geotagged photographs and 3-D visualization have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit).

As used herein, the term "location" comprises position in a fixed three-dimensional coordinate system and orientation relative to that coordinate system, except in the case of the "location of a point" (a point does not have an orientation).

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for identifying a part of a target object, comprising:
   (a) acquiring reference location image data, first geolocation data and first heading angle data using an imaging device directed toward the target object and located at a known reference location relative to a coordinate system of the target object;
   (b) acquiring feature location image data, second geolocation data and second heading angle data using an imaging device directed toward an area on the target object and located at an unknown feature location relative to the coordinate system of the target object;
   (c) computing an offset in Cartesian coordinates between the feature location and the reference location, wherein the offset is a function of coordinates in said first and second geolocation data and heading angles in said first and second heading angle data;
   (d) retrieving three-dimensional model data of the target object from a three-dimensional model database;
   (e) displaying a three-dimensional model image of at least a portion of the target object with a viewpoint that is a function of the offset computed in step (c) and the camera field-of-view angle, said three-dimensional model image representing said three-dimensional model data retrieved from the three-dimensional model database;
   (f) displaying a feature location image of the same portion of the target object as an overlay or background to said three-dimensional model image, said feature location image representing at least portions of said feature location image data;
   (g) selecting a point in the displayed feature location image;
   (h) retrieving additional three-dimensional model data from the three-dimensional model database in response to said selecting; and
   (i) displaying symbology representing the retrieved additional three-dimensional model data.

2. The method as recited in claim 1, wherein the additional three-dimensional model data comprises part identification data that identifies a part of the target object associated with an area of the three-dimensional model image containing the selected point.

3. The method as recited in claim 1, wherein the additional three-dimensional model data comprises coordinates of the selected point defined in the coordinate system of the target object.

4. The method as recited in claim 1, wherein step (c) comprises computing an offset transformation matrix that represents a location offset between the imaging device at the reference location and the imaging device at the feature location, wherein the offset transformation matrix is a function of at least coordinates in said first and second geolocation data and heading angles in said first and second heading angle data, and the viewpoint is a function of the offset transformation matrix.

5. The method as recited in claim 1, further comprising adjusting a position of the three-dimensional model image to align the three-dimensional model image with the feature location image on the display screen.

6. The method as recited in claim 1, wherein said displayed feature location image comprises an outline extracted from said feature location image data using edge detection.

7. The method as recited in claim 1, wherein the target object is an airplane.

8. The method as recited in claim 1, wherein a position of the reference location is collocated with an origin of the coordinate system of the target object.

9. The method as recited in claim 1, wherein steps (c)-(f), (h) and (i) are performed by the imaging device.

10. The method as recited in claim 1, further comprising sending said reference and feature location image data, said first and second geolocation data, and said first and second heading angle data from the imaging device to a computer system, wherein steps (c)-(f), (h) and (i) are performed by the computer system.

11. A method for identifying a part of a target object, comprising:
(a) acquiring reference location image data, first geolocation data and first heading angle data using an imaging device directed toward the target object and located at a known reference location relative to a coordinate system of the target object;
(b) constructing a reference location data file containing at least said reference location image data, said first geolocation data and said first heading angle data;
(c) acquiring feature location image data, second geolocation data and second heading angle data using an imaging device directed toward an area on the target object and located at an unknown feature location relative to the coordinate system of the target object;
(d) constructing a feature location data file containing at least said feature location image data, said second geolocation data and said second heading angle data;
(e) sending the reference and feature location data files from the imaging device to a computer system;
(f) computing an offset between the feature location and the reference location, wherein the offset is a function of coordinates in said first and second geolocation data and heading angles in said first and second heading angle data;
(g) retrieving three-dimensional model data of the target object from a three-dimensional model database;
(h) displaying a three-dimensional model image of at least a portion of the target object with a viewpoint that is a function of the offset computed in step (f) and the field-of-view angle of the imaging device, said three-dimensional model image representing said three-dimensional model data retrieved from the three-dimensional model database; and
(i) displaying a feature location image of the same portion of the target object as an overlay or background to said three-dimensional model image, said feature location image representing at least portions of said feature location image data,
wherein steps (f) through (i) are performed by the computer system.

12. The method as recited in claim 11, further comprising:
(g) selecting a point in said displayed feature location image;
(h) retrieving additional three-dimensional model data from the three-dimensional model database in response to said selecting; and
(i) displaying symbology representing the retrieved additional three-dimensional model data.

13. The method as recited in claim 12, wherein the additional three-dimensional model data comprises part identification data that identifies a part of the target object associated with an area of the three-dimensional model image containing the selected point.

14. The method as recited in claim 12, wherein the additional three-dimensional model data comprises coordinates of the selected point in the coordinate system of the target object.

15. The method as recited in claim 12, wherein step (f) comprises computing an offset transformation matrix that represents a location offset between the imaging device at the reference location and the imaging device at the feature location, wherein the offset transformation matrix is a function of at least coordinates in said first and second geolocation data and heading angles in said first and second heading angle data, and the viewpoint is a function of the offset transformation matrix.

16. The method as recited in claim 11, wherein said feature location image comprises an outline extracted from said feature location image data using edge detection.

17. A system comprising a digital camera, a GPS receiver, a digital compass, a display screen, a non-transitory tangible computer-readable storage medium storing three-dimensional model data of a target object, a three-dimensional visualization software application, and an offset computation software application, and a computer system configured to perform the following operations:
(a) computing an offset between a feature location of said digital camera and a reference location of said digital camera using offset computation software application, wherein the offset is a function of coordinates in geolocation data acquired by said GPS receiver and heading angle data acquired by said digital compass during capture of reference and feature location image data by said digital camera;
(b) retrieving said three-dimensional model data of the target object from said non-transitory tangible computer-readable storage medium;
(c) using said three-dimensional visualization software application to control said display screen to display a three-dimensional model image of at least a portion of the target object with a viewpoint that is a function of the offset computed in operation (a) and the field-of-view angle of the digital camera, said three-dimensional model image representing said three-dimensional model data retrieved from the three-dimensional model database; and
(d) using said three-dimensional visualization software application to control said display screen to display a feature location image of the same portion of the target object as an overlay or background to said three-dimensional model image, said feature location image representing at least portions of said feature location image data captured by said digital camera.

18. The system as recited in claim 17, further comprising a housing supporting said GPS receiver, said digital camera, said digital compass, said display screen, and said computer system.

19. The system as recited in claim 17, wherein said computer system comprises first and second processors, wherein said first processor is connected to receive geolocation data from said GPS receiver, heading angle data from said digital compass, and image data from said digital camera, and said second processor performs operations (a) through (d), the system further comprising a housing supporting said GPS receiver, said digital camera, said digital compass, said display screen, and said first processor, but not said second processor.

20. The system as recited in claim 19, wherein said housing is located in proximity to the target object, while said second processor is located at a distance from said housing.

* * * * *